United States Patent
Hanamoto

(10) Patent No.: US 9,135,746 B2
(45) Date of Patent: Sep. 15, 2015

(54) IMAGE PROCESSING APPARATUS AND CONTROL METHOD THEREOF

(75) Inventor: Takashi Hanamoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 358 days.

(21) Appl. No.: 13/568,521

(22) Filed: Aug. 7, 2012

(65) Prior Publication Data
US 2013/0038619 A1    Feb. 14, 2013

(30) Foreign Application Priority Data
Aug. 11, 2011 (JP) ................................. 2011-176044

(51) Int. Cl.
*G09G 5/00* (2006.01)
*G06T 15/50* (2011.01)

(52) U.S. Cl.
CPC .................................. *G06T 15/506* (2013.01)

(58) Field of Classification Search
CPC ....... G06T 15/506; G06T 15/50; G06T 15/60; G06T 15/80; G06T 15/06
USPC ................. 345/419, 421–422, 426, 581–584; 382/154
See application file for complete search history.

(56) References Cited

U.S. PATENT DOCUMENTS

| 5,680,525 | A  | * | 10/1997 | Sakai et al. ................. 345/585 |
| 8,674,988 | B2 | * | 3/2014  | Tamstorf et al. ............. 345/426 |
| 2005/0046639 | A1 | * | 3/2005 | Leather ........................ 345/584 |
| 2005/0285859 | A1 | * | 12/2005 | Fossum et al. ............... 345/421 |
| 2006/0152931 | A1 | * | 7/2006 | Holman ........................ 362/297 |
| 2006/0170681 | A1 | * | 8/2006 | Ohba ........................... 345/426 |
| 2007/0206008 | A1 | * | 9/2007 | Kaufman et al. ............. 345/424 |
| 2009/0109221 | A1 | * | 4/2009 | Planck et al. ................ 345/426 |
| 2010/0215257 | A1 | * | 8/2010 | Dariush et al. ............... 382/159 |

FOREIGN PATENT DOCUMENTS

| JP | 2006-506742 A  | 2/2006 |
| WO | 2004047008 A1  | 6/2004 |

* cited by examiner

*Primary Examiner* — Todd Buttram
(74) *Attorney, Agent, or Firm* — Canon USA Inc IP Division

(57) ABSTRACT

An image processing apparatus configured to perform an appropriate blurring processing in which a height difference in the surface shape with fine unevenness is taken into consideration, and to reproduce the surface shape faithfully corresponding to an original image. The image processing apparatus for generating computer graphics expressing an object includes a first acquisition unit configured to acquire height information representing a relative height difference in a surface of the object, a second acquisition unit configured to acquire at least one scattering function representing an internal scattering characteristic of light in the object, and a calculation unit configured to calculate a luminance value of the object based on the height information and the scattering function.

13 Claims, 15 Drawing Sheets

RAY TRACING PROCESS

RENDERING RESULT

FIG.5A
RENDERING EQUATION OF INTERNAL SCATTERING
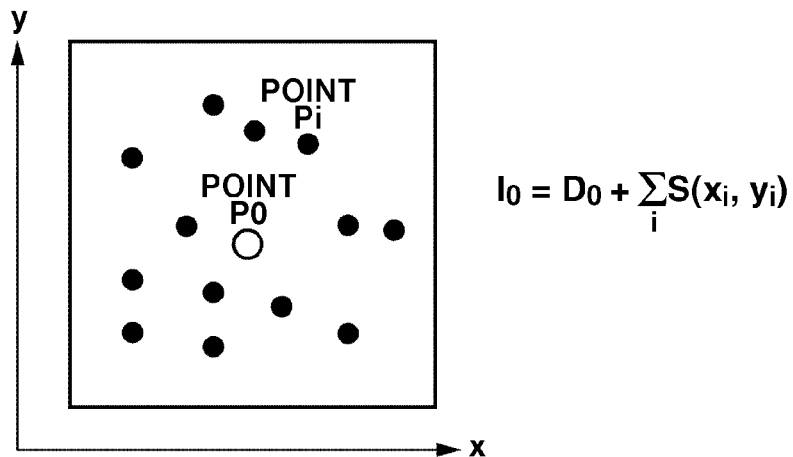
$$I_0 = D_0 + \sum_i S(x_i, y_i)$$
FIG.5B
DISTANCE BETWEEN POINT P0 AND POINT Pi
$$r_i = \sqrt{x_i^2 + y_i^2 + z_i^2}$$
FIG.5C
SCATTERING FUNCTION S(r)
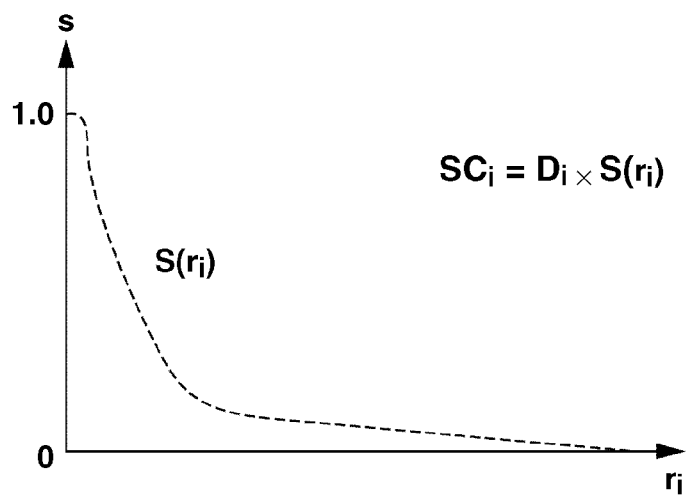
$$SC_i = D_i \times S(r_i)$$

NORMAL LINE TO PLANE SURFACE

NORMAL LINE TO SLANTED SURFACE

WHEN ONLY REPLACING NORMAL LINE TO PLANE SURFACE WITH NORMAL LINE TO SLANTED SURFACE

RENDERING RESULT BY BUMP MAPPING METHOD

POLYGON-BASED SAMPLING $$r_i(j) = \sqrt{x_j^2 + z_j^2}$$

SAMPLING WHILE CONSIDERING NORMAL LINE MAP $$rh_i(j) = \sqrt{x_j^2 + y_j^2 + z_j^2}$$

CONSTRAINT CONDITION OF POINT Pi(j)

POLAR COORDINATE SYSTEM
HAVING POINT Pi AS THE CENTER

CONSTRAINT CONDITION OF POINT Pi(j)
WHILE CONSIDERING HEIGHT INFORMATION

IMAGE PROCESSING APPARATUS AND CONTROL METHOD THEREOF

BACKGROUND OF THE INVENTION

1. Field of the Invention

The present invention relates to a technique capable of expressing, by using computer graphics (CG) technology, a physical object in which internal scattering of light is caused.

2. Description of the Related Art

Nowadays, using computer graphics (hereinafter, also called "CG") enables images of physical objects such as metal, glass, and so on to be expressed at a level comparable to the original images. On the other hand, it is difficult for images of the physical objects such as skin, marble, milk, and the like, in which internal scattering of light is caused, to be expressed at a level equivalent to the original images.

In particular, the skin has fine unevenness on its surface, and therefore, it is difficult to express the image thereof in CG at a level comparable to the original image. In order to express the skin image comparable to the original image, it is important to reproduce internal scattering of light entering the skin, as well as to reproduce fine unevenness of the skin such as wrinkles, and pores.

As a method of reproducing the internal scattering, a technique discussed in Japanese Unexamined Patent Application (Translation of PCT Application) No. 2006-506742 is known. In the technique discussed in Japanese Unexamined Patent Application (Translation of PCT Application) No. 2006-506742, a plurality of points is sampled, and blurring processing is performed by integrating pixel values using Bidirectional Scattering Surface Reflectance Distribution Function (BSSRDF function). Meanwhile, as a method for reproducing fine unevenness, processing for expressing the surface shape using a bump mapping method is generally known. Normally, when the skin image is reproduced in CG, the blurring processing is performed after reproducing the fine unevenness thereof.

However, when the blurring processing is performed after reproducing the fine unevenness of the skin surface, there may be a case where the fine unevenness thereof is lost due to the blurring processing. The reason for this is that the blurring processing has been performed without considering height differences on the surface of the skin with fine unevenness.

SUMMARY OF THE INVENTION

The present invention relates to an image processing apparatus and a control method thereof capable of reproducing a surface shape faithfully corresponding to the original image by reproducing internal scattering of light through a blurring processing performed in an appropriate manner while taking height differences in the surface shape having fine unevenness into consideration.

According to an aspect of the present invention, an image processing apparatus for generating a computer graphic expressing an object includes: a first acquisition unit for acquiring height information which represents a relative height difference in a surface of the object; a second acquisition unit for acquiring at least one scattering function which represents an internal scattering characteristic of light of the object; and a calculation unit for calculating each pixel value of the object based on the height information and the scattering function.

According to the present invention, the surface shape faithfully corresponding to the original image can be reproduced by performing the blurring processing in an appropriate manner while taking the height differences in the surface shape having fine unevenness into consideration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A through 5C are diagrams illustrating internal scattering of light.

DESCRIPTION OF THE EMBODIMENTS

Various exemplary embodiments, features, and aspects of the invention will be described in detail below with reference to the drawings.

A configuration described in the exemplary embodiments below is merely an example, and the invention is not limited thereto.

Figure 1:
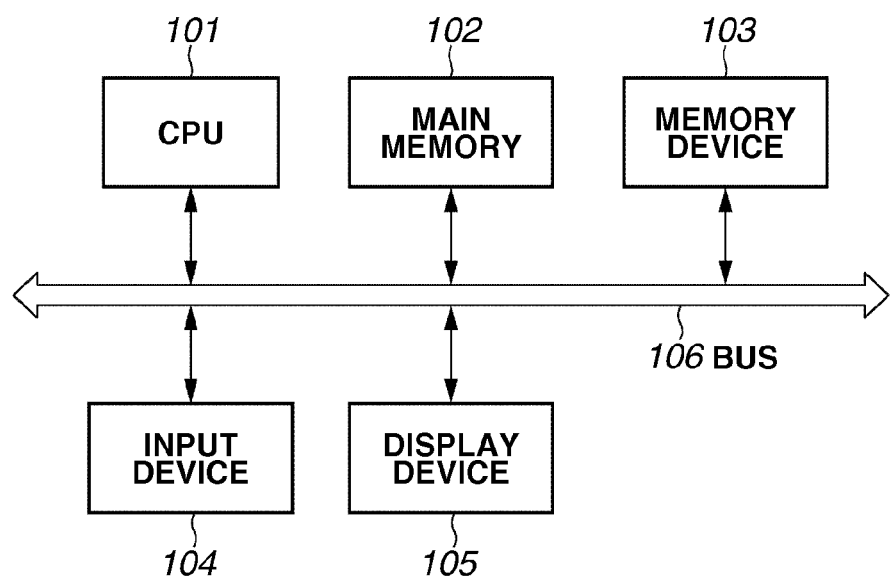
FIG. 1 is a block diagram illustrating a system configuration of an image processing apparatus.

FIG. 1 is a block diagram illustrating a system configuration of a CG generation apparatus (i.e., image processing apparatus) that can be applied to the present exemplary embodiment. The CG generation apparatus includes a central processing unit (CPU) 101, a main memory 102, a memory device 103, an input device 104, a display device 105, and a bus 106. The CPU 101 executes an arithmetic processing and various programs. The main memory 102 provides the CPU 101 with a program, data, a work area, and so on, which are necessary for the processing.

The memory device 103 stores an image generation program, property data of a light source and an object. A hard disk drive may be used as the memory device 103, for example. Details of the property data of the light source and the object will be described below.

The input device 104, such as a keyboard or a mouse, is a device for inputting user operation. The display device 105 displays images generated by the CPU 101, and is configured of a CRT or a liquid crystal display. The bus 106 is a communication line for connecting the above-described devices. Although various constituent devices other than the above-described devices are present in the system configuration, descriptions thereof will be omitted as they are not important in the present exemplary embodiment.

Figure 2A:
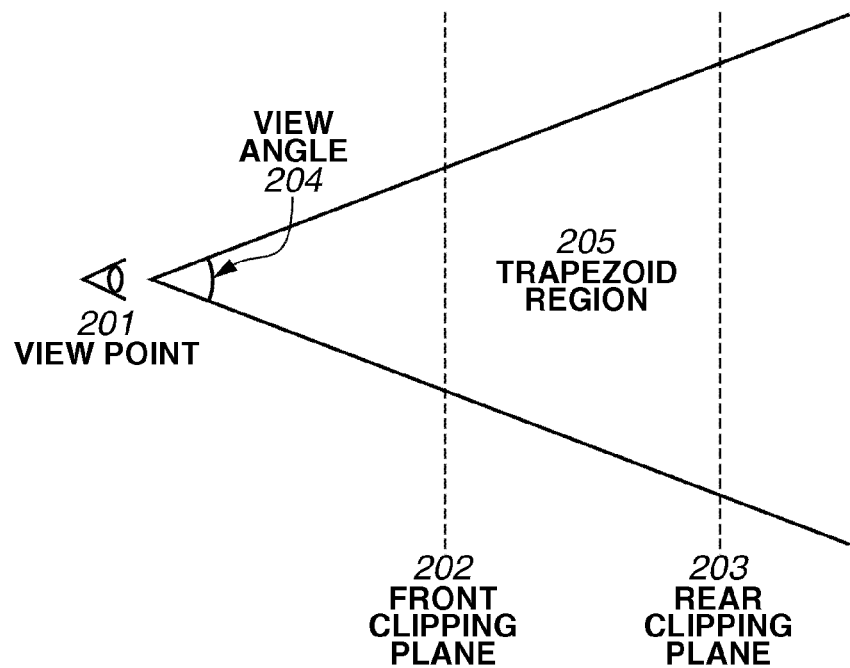
FIGS. 2A and 2B are diagrams schematically illustrating ray tracing.
Figure 2B:
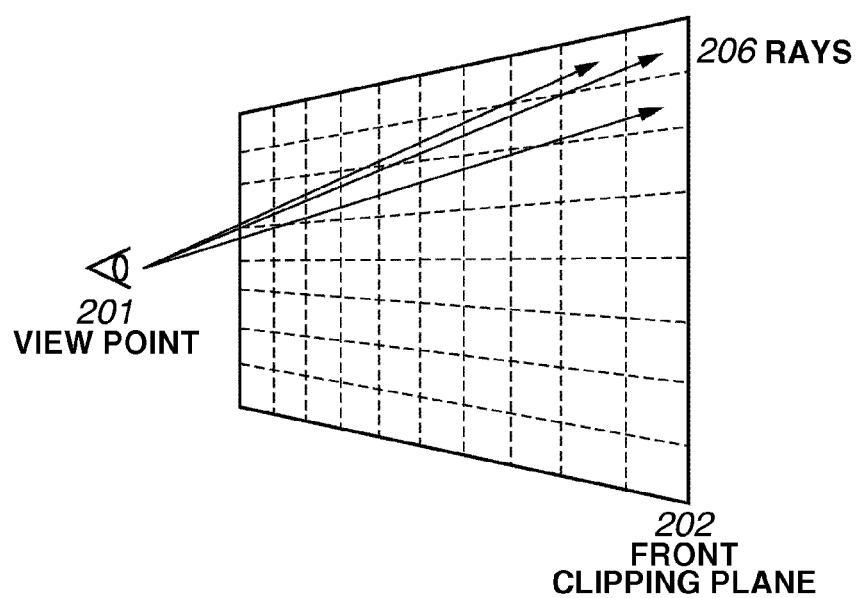

FIGS. 2A and 2B are diagrams schematically illustrating ray tracing. As illustrated in FIG. 2A, a view point 201, a view angle 204, a front clipping plane 202, and a rear clipping plane 203 are determined when rendering is performed. A trapezoid region 205 surrounded by the view angle 204, the front clipping plane 202, and the rear clipping plane 203 is defined as a rendering region.

Various objects to be rendering targets are placed in the rendering region. When the rendering region is determined, rays (rays of light) 206 are emitted from the view point 201 to the front clipping plane 202 for each pixel, as illustrated in FIG. 2B. In a case where the rendering result is to be displayed in 800×600 pixels, the front clipping plane 202 is divided into the pixels of 800×600.

Figure 3A:
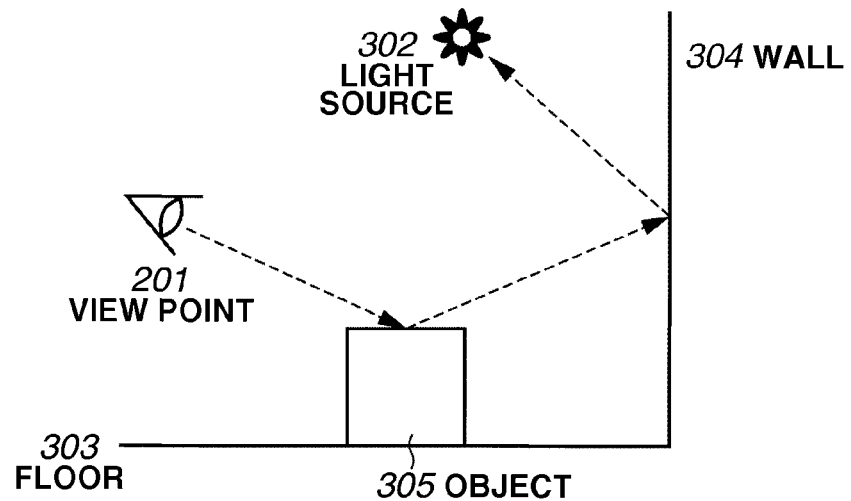
FIGS. 3A and 3B are diagrams illustrating a method of ray tracing.
Figure 3B:
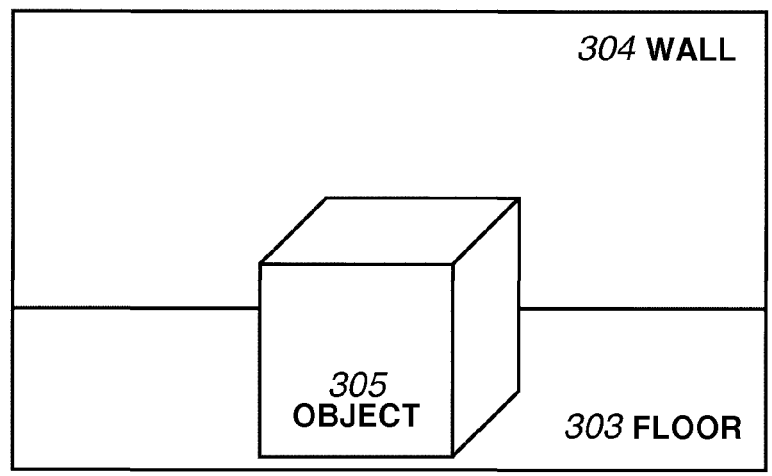

Behavior of the emitted rays 206 is described with reference to FIGS. 3A and 3B. The rays 206 emitted from the view point 201 pass through the front clipping plane 202 and hit an object 305. Thereafter, the rays 206 hit a wall 304, and finally a light source 302.

Herein, reflectance of the object 305 and the wall 304 with respect to the light having a wavelength λ is defined as kλ305, kλ304, respectively, and spectral radiance of the wavelength λ of the light source 302 is defined as Lλ. At this time, the spectral radiance of the wavelength λ entering the view point 201, i.e., luminance D of surface reflected light is expressed as D=kλ305×kλ304×Lλ. Herein, when the reflectance of each object with respect to the light having the wavelength λ is defined as kλM, Equation 1 holds.

$$D = \prod_M k_{\lambda M} \times L_\lambda \qquad \text{Equation 1}$$

By using Equation 1, luminance corresponding to the wavelength (component value) for each pixel can be calculated. The spectral radiance (i.e., luminance of the surface reflected light) for all the wavelengths is calculated through Equation 1, and calculated values are added to acquire a total value.

In a case where the target object is not includes internal scattering, a pixel value representing each pixel can be calculated when the acquired total value of the luminance of the surface reflected light with respect to the all wavelengths is converted into a RGB value using a color-matching function or the like. The result acquired therefrom is illustrated in FIG. 3B. In addition, it is also possible to directly acquire the pixel value in RGB by matching the wavelength λ to each wavelength in RGB.

In the ray tracing, a CG image is generated by calculating the pixel values of all pixels on the front clipping surface. As described above, in order to generate a CG image which corresponds to the original image as faithfully as possible, it is necessary to reproduce fine unevenness and internal scattering of an object surface where the rays (rays of light) emitted from the view point have hit. Therefore, in the present exemplary embodiment, in addition to simply calculating the pixel value using Equation 1, processing capable of achieving both the reproduction of fine unevenness and the reproduction of internal scattering is performed.

Figure 4:
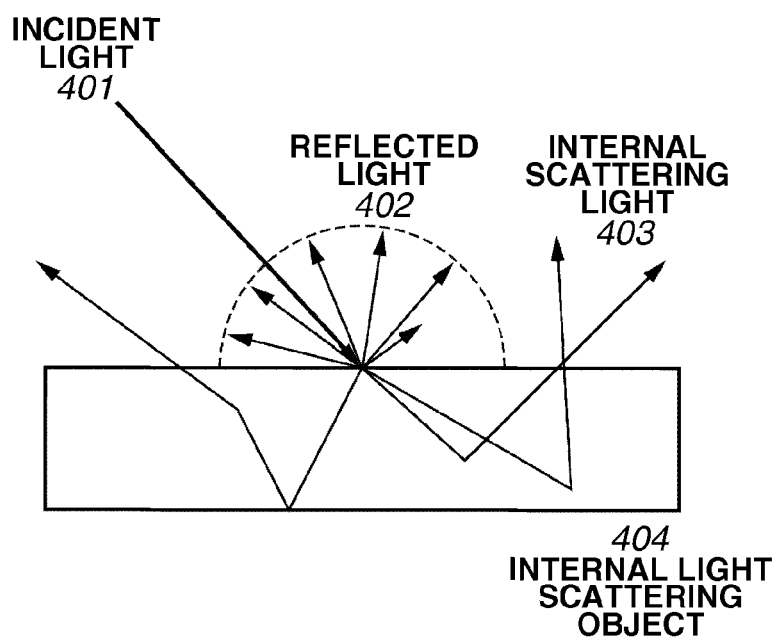
FIG. 4 is a diagram illustrating internal scattering of light.

First, processing for reproducing the internal scattering of light is described. FIG. 4 is a diagram illustrating a reflection characteristic of an object. In a case where incident light 401 enters an internal light scattering object 404, the incident light 401 is divided into reflected light 402 which is reflected on a surface of the internal light scattering object 404, and internal scattering light 403 which enters the internal light scattering object 404, scatters therein, and goes outside thereof.

Radiance of light emitted from a certain point on the object surface can be acquired from the light that is reflected on the point, and internal scattering light that enters through a point other than the certain point, scatters internally, and is emitted from the certain point. Therefore, by using the luminance D of the surface reflected light and luminance $$\sum_{x,z} S(x, z)$$

of internal scattering light, an entire spectral radiance I (radiance) of the light emitted from the certain point of the object surface can be expressed by the following Equation 2.

$$I = D + \sum_{x,z} S(x, z) \qquad \text{Equation 2}$$

The above Equation 2 is generally known as BSSRDF function.

Equation 2 is described in detail with reference to FIGS. 5A, 5B, and 5C. In FIG. 5A, acquiring the radiance I0 of a point P0 is considered. At this time, luminance of the light emitted from the point P0 is a sum of the luminance of the surface reflected light at the point P0, and the luminance of the internal scattering light that enters each point Pi, scatters internally, and is emitted from the point P0.

As illustrated in FIG. 5C, luminance SCi of the internal scattering light from the point Pi can be expressed by using a product of a scattering function S(ri) and luminance Di of the surface reflected light at the point Pi. Here, "ri" represents a distance between the point P0 and the point Pi. In other words, the luminance of the internal scattering light, which passes through the point Pi, scatters internally, and is emitted from the point P0, is determined based on the distance between the point Pi and the point P0.

Originally, ri is a distance in three dimensions, and can be expressed by the equation illustrated in FIG. 5B. Further, when ri=0, a value of the scattering function S(0) is 1.0, whereas the luminance SCi of the internal scattering light is equal to the luminance Di of the surface reflected light of the point Pi. Thus, rendering of the object including internal scattering can be performed through a calculation of the pixel value of each pixel using Equation 2.

A term relating to the internal scattering light indicated in Equation 2 has a different scattering function for each wavelength of a spectrum. Accordingly, the radiance of the point P0 can be acquired by calculating the luminance D of the surface reflected light and the luminance S of the internal scattering light for each wavelength, and adding the luminance D of the surface reflected light and the luminance S of the internal scattering light for all the wavelengths.

Figure 6A:
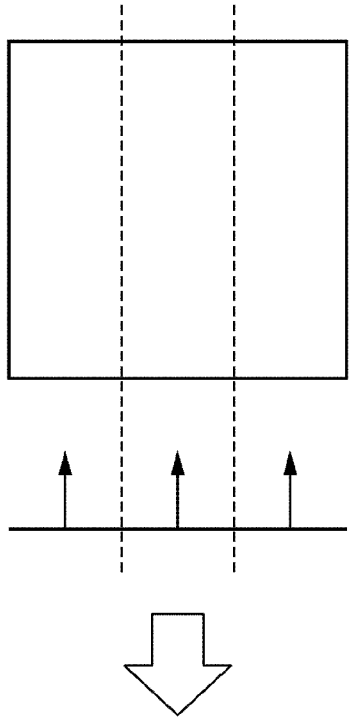
FIGS. 6A through 6C are diagrams illustrating a bump mapping method.
Figure 6B:
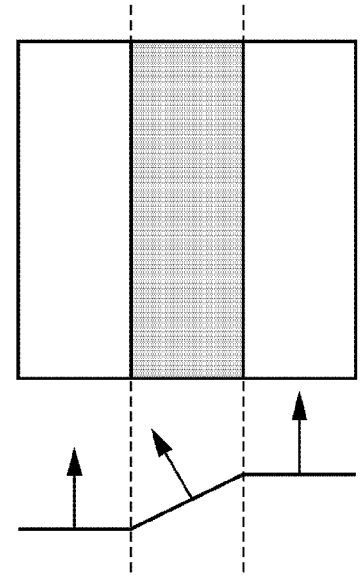
Figure 6C:
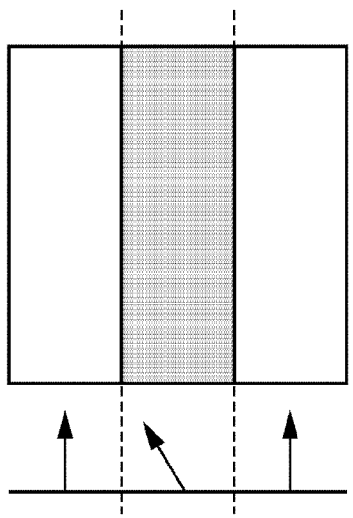

Next, processing for reproducing fine unevenness is described. FIGS. 6A through 6C are diagrams illustrating a bump mapping method for reproducing the fine unevenness.

When the fine unevenness such as wrinkles and pores is reproduced by using polygons, it is necessary to have an amount of data equivalent to several hundreds of millions of polygons. Therefore, a method in which the fine unevenness can be reproduced with a smaller number of polygons may be required. The bump mapping method reproduces fine unevenness in a pseudo manner using the data which stores normal line directions instead of polygons (hereinafter, referred to as "normal line map").

As illustrated in FIG. 6A, the direction of the normal line to the plane surface is upward at each point. On the other hand, as for the surface including a slanted surface, a normal line to the slanted surface is in a slanted direction, as illustrated in FIG. 6B. If the normal line to the slanted surface is applied onto the plane surface, as illustrated in FIG. 6C, a shadow is generated thereon as in the same manner as in the slanted surface. In this way, it is possible to make the plane surface look like the slanted surface using the normal line map.

Figure 7:
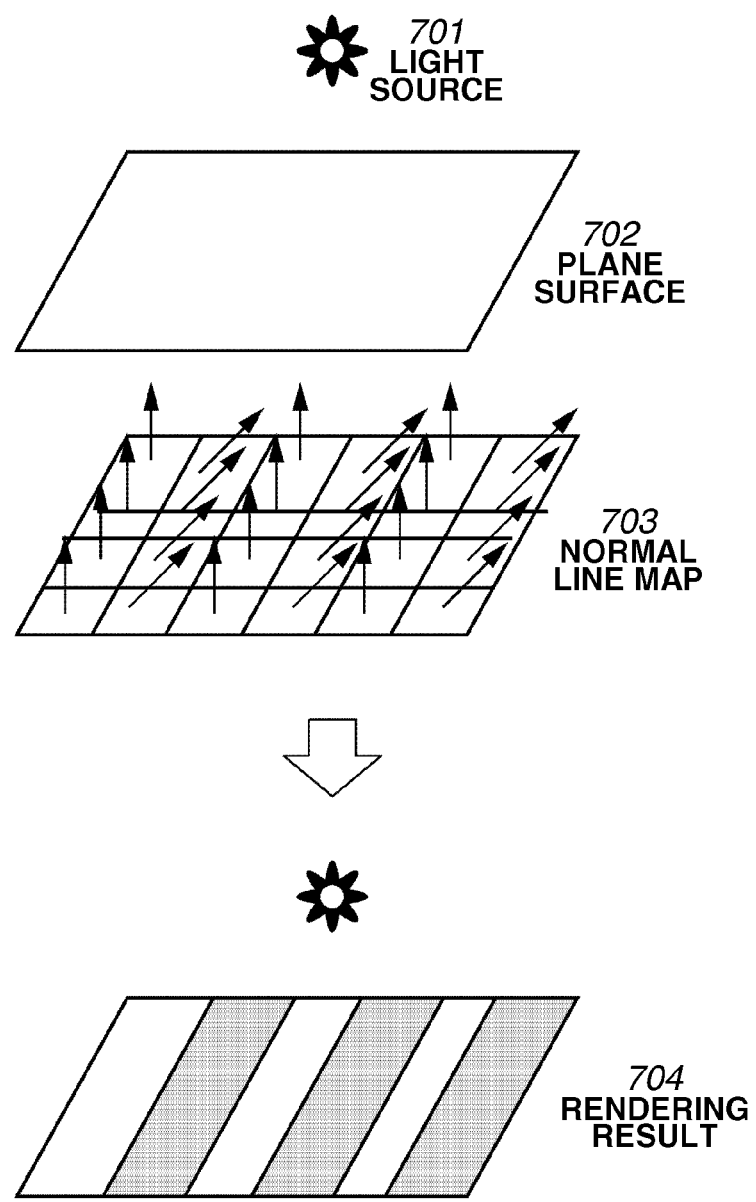
FIG. 7 is a diagram illustrating a bump mapping method.

Further, descriptions will be given in detail with reference to FIG. 7. With respect to a plane surface 702, a light source 701 is disposed on the upper side thereof. A vector, which represents the intensity and direction of light from the light source received at a specific point, is defined as a light source vector. The plane surface 702 is evenly irradiated with the light from the light source 701. Therefore, the light source vectors on the plane surface 702 are uniform in all locations. When a normal line map 703 is incorporated therein, shadows are generated on a rendering result 704 according to slants of the normal lines.

More specifically, the shadow in each point is acquired based on the inner product of each normal line and a light source vector in the normal line map 703. At this time, a normal vector and height information are stored on each pixel of the normal line map 703. Through this, the rendering result 704, which makes the plane surface 702 look like having uneven surface, can be acquired.

The processing for generating a shadow on a plane surface through a calculation using the bump mapping method is referred to as shadowing processing. In a case where a plurality of light sources is provided on the rendering region, the respective light source vectors applied to one point may be added up.

Figure 8:
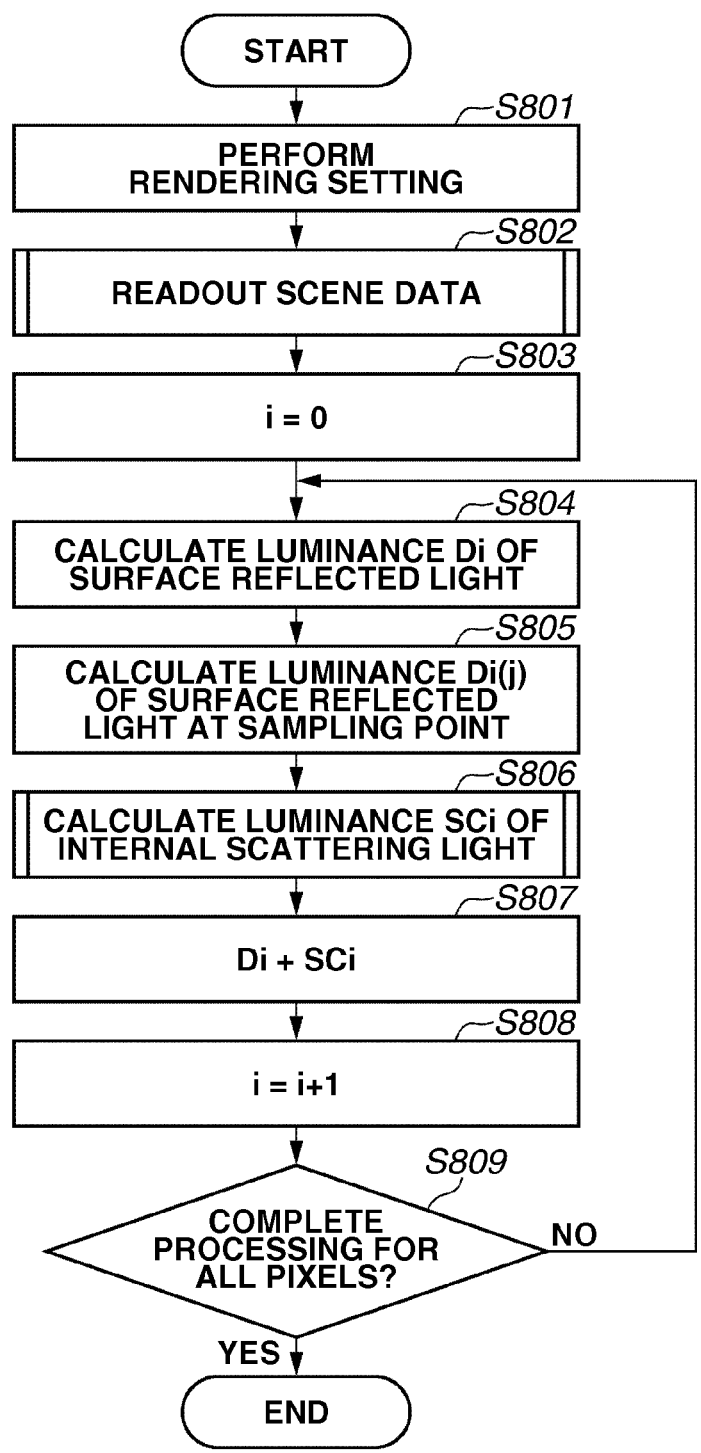
FIG. 8 is a flowchart illustrating a rendering processing.

FIG. 8 is a flowchart illustrating a CG generation processing which can be applied to the present exemplary embodiment.

In step S801, settings for a rendering size (number of pixels), a front clipping plane, and a rear clipping plane are performed. Herein, the rendering size is set to be N-pixels.

In step S802, scene data such as view point data, light source data, object data are read. Specifically, the view point data represents a view point position, a line-of-sight direction, and a view angle. The light source data represents spectral radiance, which is the spectral luminance information of the light source, a position of the light source in a virtual space, and so on.

The spectral radiance of the light source is a luminance distribution for each wavelength, and characteristics thereof may vary depending on the light source. Distribution of the spectral radiance varies when a different type of light source is used, which may cause appearance of color of the object to be varied. Therefore, the type of light source is an important element for reproducing an image of the object in a faithful manner.

The object data represents reflectance, an internal scattering function, and a normal line map for each wavelength, in addition to a number of the objects, a location and a shape of each object disposed on a virtual space. The reading processing of the normal line map is described in detail referring to another flowchart.

In step S803, a variable "i" is initialized to 0, and ray tracing processing for each pixel is started. The processing described hereinafter will be executed to all the wavelengths unless otherwise mentioned.

In step S804, the luminance Di of the surface reflected light of the i-th pixel Pi is calculated using Equation 1. At this time, the calculation of the luminance Di is carried out after performing the shadowing processing on the surface of the object based on the light source vector and the normal line map that have been readout in step S802.

In step S805, M-points of sampling points Pi(j) are set in the periphery of the pixel Pi, and the luminance Di(j) of the surface reflected light for each sampling point Pi(j) is calculated. At this time, the calculation of the luminance Di(j) is carried out after performing the shadowing processing on the surface of the object based on the light source vector and the normal line map that have been read out in step S802.

In step S806, the luminance SCi of the internal scattering light of the pixel Pi is calculated. Calculation of the luminance of the internal scattering light of the pixel Pi is described in detail referring to another flowchart.

In step S807, the luminance value of the i-th pixel Pi is calculated by adding the luminance Di of the surface reflected light of the pixel Pi and the luminance SCi of the internal scattering light entering through M-points of sampling points and coming out from the pixel Pi. The pixel value of the pixel Pi is calculated when the luminance value of each wavelength is converted into a RGB value using the color-matching function or the like.

In step S808, the variable i is increased by one. In step S809, the number of pixels N is compared to the variable i, so as to determine whether or not the ray tracing processing has been completed for all the pixels. When the ray tracing processing is determined to be "completed" (YES in step S809), all the processing is ended, while the processing returns to step S804 to continue the processing when the ray tracing processing is determined to be "not completed" (NO in step S809).

Figure 9:
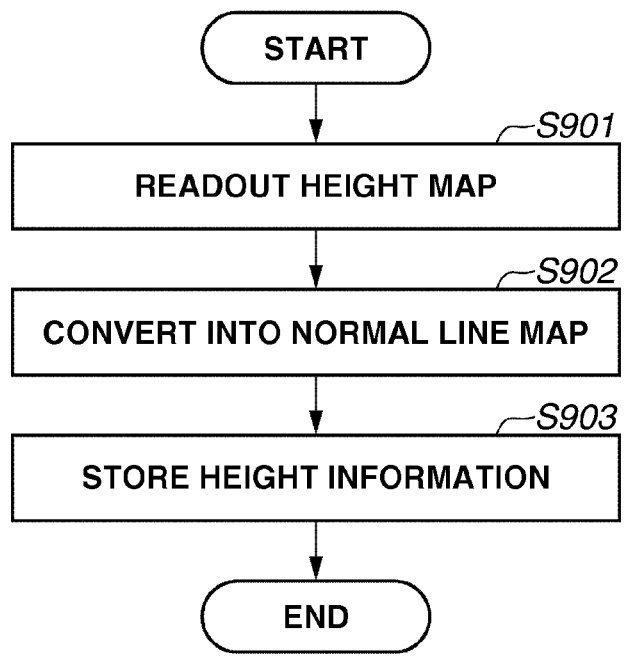
FIG. 9 is a flowchart illustrating a readout processing of normal line map data.

FIG. 9 is a flowchart illustrating a readout processing of the normal line map performed in step S802. In general, the normal line map is generated from a height map. The height map stores distances in the height direction from the plane surface which serves as a reference. In the present exemplary embodiment, the normal line map is also readout by generating the normal line map from the height map.

In step S901, the height map which stores height information is readout. The height information represents a relative height from the plane surface serving as a reference.

In step S902, an amount of change in height is calculated from the height map, and the normal line map is generated therefrom. The above method has already been described in books, documents, and the like, and has been well-known. Therefore, the description thereof will be omitted.

In step S903, the height information is stored with respect to the generated normal line map. With this, the height information can also be used in a post-processing. In the case where the normal line map is used as input data instead of the height map, information thereof is stored so as to calculate the height information from a slant of the normal line. Although the normal line map and the height map have been exemplified, any types of information may be applicable as long as the height information can be acquired therefrom.

Figure 10:
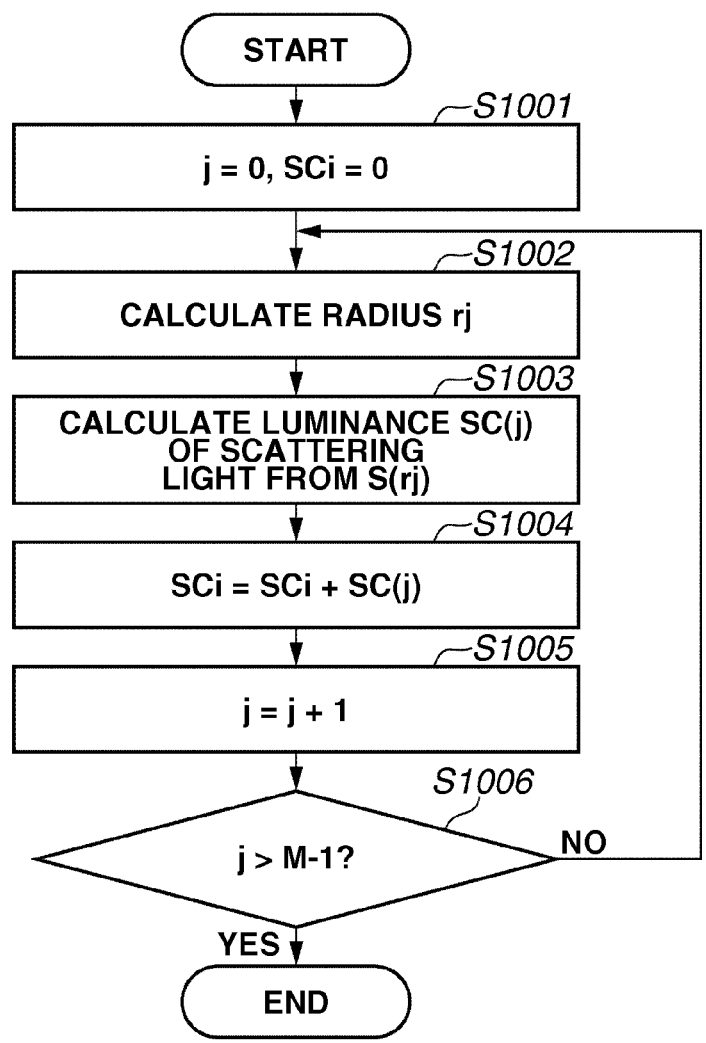
FIG. 10 is a flowchart illustrating a method for reproducing internal scattering using a blurring processing.

FIG. 10 is a flowchart illustrating reproducing processing of the internal scattering performed in step S806.

In step S1001, a variable j is initialized to 0. In addition, the luminance SCi of the internal scattering light of the pixel Pi is also initialized to 0.

Figure 15A:
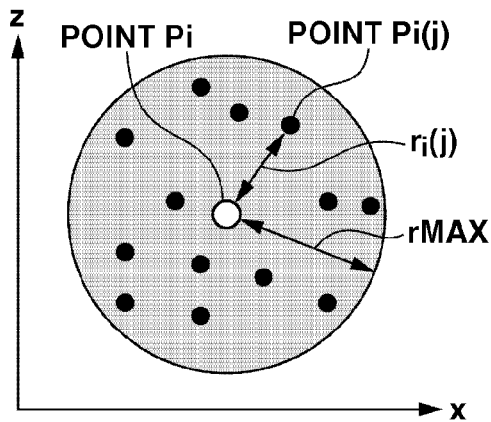
FIGS. 15A through 15C are diagrams illustrating a method for setting a coordinate value of a sampling point.

In step S1002, a distance ri(j) between the pixel Pi and the j-th sampling point Pi(j) is calculated. First, a method for setting a coordinate value of the sampling point Pi(j) is described with reference to FIG. 15A. A coordinate value (xj, zj) is determined by using random numbers, with a constraint condition being used with respect to the coordinate value. This is because the scattering function S(r) becomes S(rMAX)=0 in a range of r≥rMAX, and thus it will be of no use even if the sampling point Pi(j) is generated in such a region.

Figure 15B:
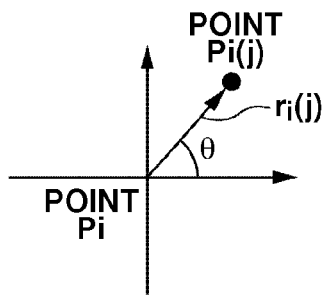

Therefore, as illustrated in FIG. 15B, a polar coordinate system having a point Pi as the center is employed, and random numbers ri(j) and θ are generated to satisfy respective conditions of 0<ri(j)<rMAX, and 0≤θ<2π. Thereafter, the values thereof in the polar coordinate system are converted into the coordinate value (xj, zj), so that the coordinate value for the sampling point Pi(j) can be set.

Figure 11A:
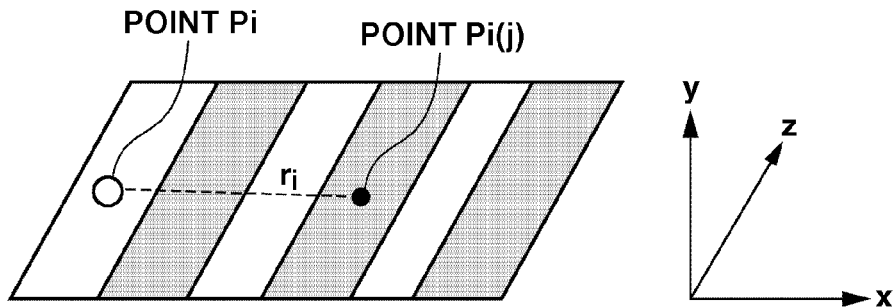
FIGS. 11A through 11C are diagrams illustrating a method for calculating a distance between respective points of internal scattering.

Next, a method for calculating a distance taking the height information into consideration is described with reference to FIGS. 11A through 11C. A plane surface of the rendering result 704 in FIG. 7, for example, on which the shadowing processing has been performed using the bump mapping method, is considered. At this time, the point Pi and the sampling point Pi(j) are present on a same plane if only the polygon is taken into consideration. Therefore, the calculation of the distance ri(j) is performed by only taking an x-z axis direction into consideration, and thus, the distance can be calculated by Equation 3 as illustrated in FIG. 11B.

$$r_i(j)=\sqrt{x_j^2+z_j^2} \qquad \text{Equation 3}$$

That is, the distance between the point Pi and the sampling point Pi(j) is acquired without taking the height difference between the point Pi and the sampling point Pi(j) into consideration. Accordingly, the random number ri(j) is the distance, as it is. However, as illustrated in FIG. 11C, a height difference arises between the point Pi and the sampling point Pi(j) if the distance is calculated by taking both the height information and the polygon into consideration, not only the polygon.

Figure 11B:
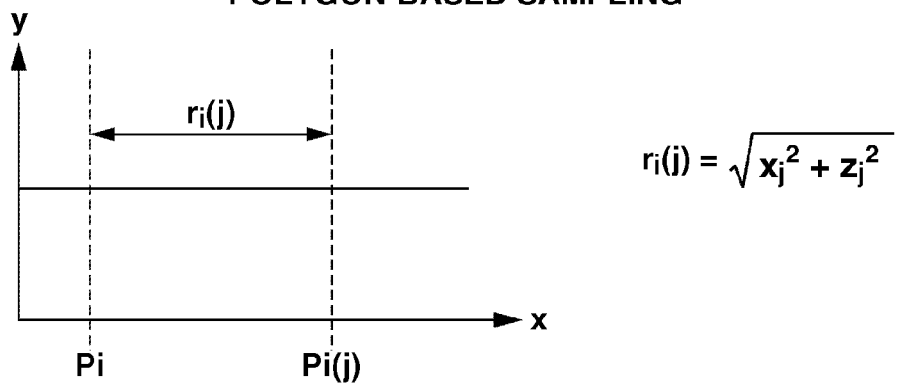

As a result, the distance rhi(j) taking the height information into consideration becomes greater than the distance ri(j) in FIG. 11B. In this case, the height information yj, which is necessary to calculate the distance rhi(j), is acquired from the normal line map generated through the processing described in FIG. 9. The height information is stored in the normal line map, so that the value thereof can be used as the height information yj.

In the scattering function S(r) of FIG. 5C, a value of the luminance SCi(j) of the internal scattering light becomes greater as the distance ri(j) becomes smaller. In other words, the influence of the internal scattering light becomes greater in a shorter distance, which causes a rendering result to be blurred.

Accordingly, if the distance is calculated based only on polygons without taking the height difference between the point Pi and the sampling point Pi(j) into consideration, the distance is calculated as a value that is smaller than the value that originally should be, and thus the blurring processing is performed more than necessary. As a result, reproducibility of the fine unevenness is degraded.

Figure 11C:
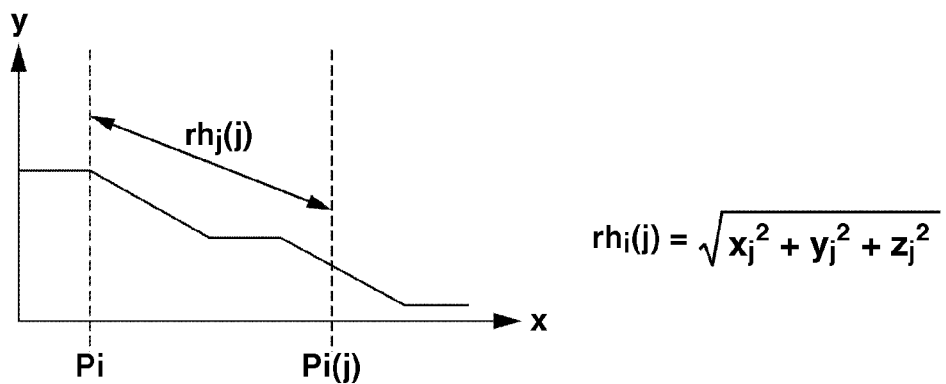

Therefore, in the present exemplary embodiment, the distance rhi(j), which takes the normal line map illustrated in FIG. 11C into consideration, is used to calculate the distance between the point Pi and the sampling point Pi(j). Meanwhile, in a case where the height information in the y-direction for each point is not included in the normal line map, the height information thereof is calculated from the normal line vector. This method has already been published in literature and the like as a commonly-used method, and therefore, the description thereof will be omitted.

Figure 15C:
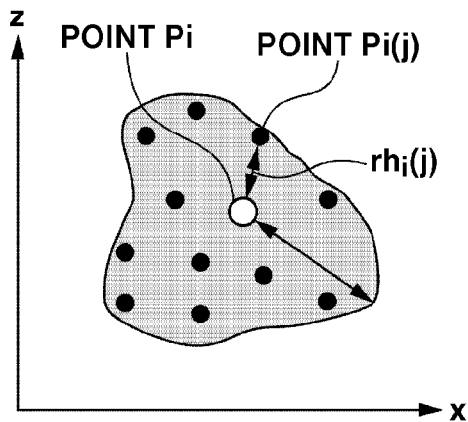

Further, when the height information is taken into consideration, the constraint condition with respect to the coordinate value (xj, zj) of the sampling point Pi(j) is also changed. This will be briefly described referring to FIG. 15C. The distance is expressed by Equation 4 when the height information is taken into consideration.

$$rh_i(j)=\sqrt{x_j^2+y_j^2+z_j^2} \qquad \text{Equation 4}$$

At this time, the relationship between the distance rhi(j) and the distance ri(j) can be expressed as Equation 5.

$$r_i(j)=\sqrt{rh_i^2(j)-y_j^2} \qquad \text{Equation 5}$$

Since the maximum value of the distance rhi (j) is rMAX, the range of ri is expressed as Equation 6.

$$0<r_i(j)<\sqrt{r_{MAX}^2-y_j^2} \qquad \text{Equation 6}$$

The height information yj may vary depending on the direction θ in the polar coordinate system. Therefore, the range of the distance ri(j) can be replaced with 0<ri(j)<rMAX(θ), and expressed by a gray region illustrated in FIG. 15C.

In this case, calculating and holding the maximum value of the distance ri(j) for each direction θ enables the sampling to be performed in an efficient manner. Specifically, the sampling is started with the above maximum value being set as rMAX(θ)=rMAX at the beginning of the processing.

In the sampling processing, the distance rhi(j) is calculated when the random number ri(j)(ri(j)<rMAX(θ)) is generated in the vicinity of rMAX(θ). If the scattering function S (rhi(j)) is equal to 0 (S(rhi(j))=0), the value thereof is replaced with rMAX(θ)=ri(j), so as to gradually narrow the sampling range.

In step S1003, the luminance SCi(j) of the internal scattering light is calculated from the distance rhi(j) taking the height information into consideration, and the luminance Di(j) of the surface reflected light of the sampling point Pi(j).

In step S1004, the calculated luminance SCi(j) of the internal scattering light is added to the luminance SCi. In step S1005, the variable j is increased by 1. In step S1006, the variable j is compared to the number of samplings M to determine whether the processing for all the sampling points has been completed.

If the processing is determined to be "completed" for all the sampling points (YES in step S1006), the entire processing is ended, while the processing returns to step S1002 to continue processing if the processing is determined to be "not completed" (NO in step S1006). Through this, it is possible to calculate the luminance of the internal scattering light that enters through each sampling point and is emitted from the point Pi.

With the above processing, the processing for reproducing the internal scattering is executed using the bump mapping method. Thus, the skin image can be reproduced with high precision. In the present exemplary embodiment, a calculation method using a spectral radiance has been described. However, the same result can be obtained by a method executed in a color space such as a RGB, an XYZ, a Lab, and the like.

In the above-described exemplary embodiment, a method for calculating the luminance of the internal scattering light based on the height information of the normal line map has been described. In a second exemplary embodiment of the invention, a method, in which the scattering function is used while being switched between a plurality of scattering functions according to the height information of the normal line map, is described.

Figure 12A:
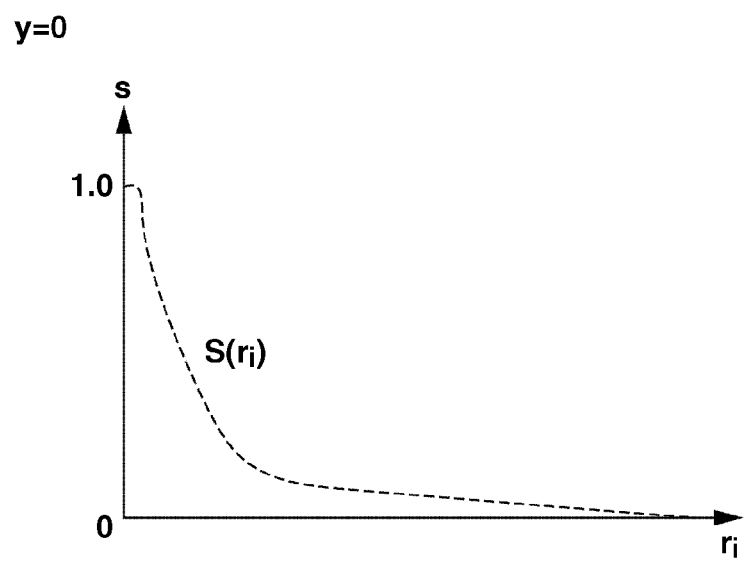
FIGS. 12A and 12B are graphs illustrating changes in scattering functions according to height information.
Figure 12B:
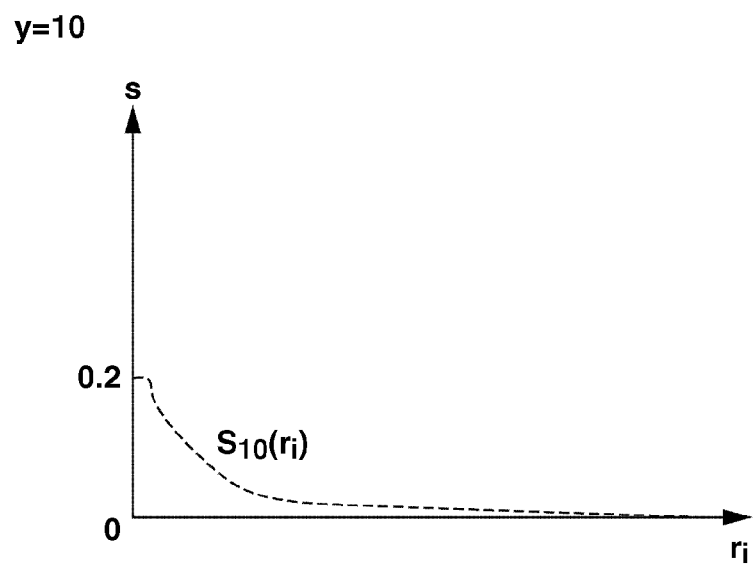

FIGS. 12A and 12B are diagrams schematically illustrating a state in which a scattering function varies according to the height information of the normal line map. The scattering function illustrated in FIG. 12A is employed when the height information y is 0. On the other hand, the scattering function illustrated in FIG. 12B is employed when the height information y is 10. In this manner, the scattering function shows a smaller value when the height information y has a greater value.

In the present exemplary embodiment, a plurality of scattering functions Sy(r) is provided for each height information. The luminance of the internal scattering light emitted from each point is calculated by using a necessary scattering function as appropriate according to the height information y of the point Pi.

In a case where the scattering function corresponding to a y-value of integer of $0 \leq y \leq 10$ is provided, for example, eleven scattering functions may be available. Further, as for the processing of the value of a real number such as y=1.5, the scattering function is used by interpolating the scattering function of each integer.

Figure 13:
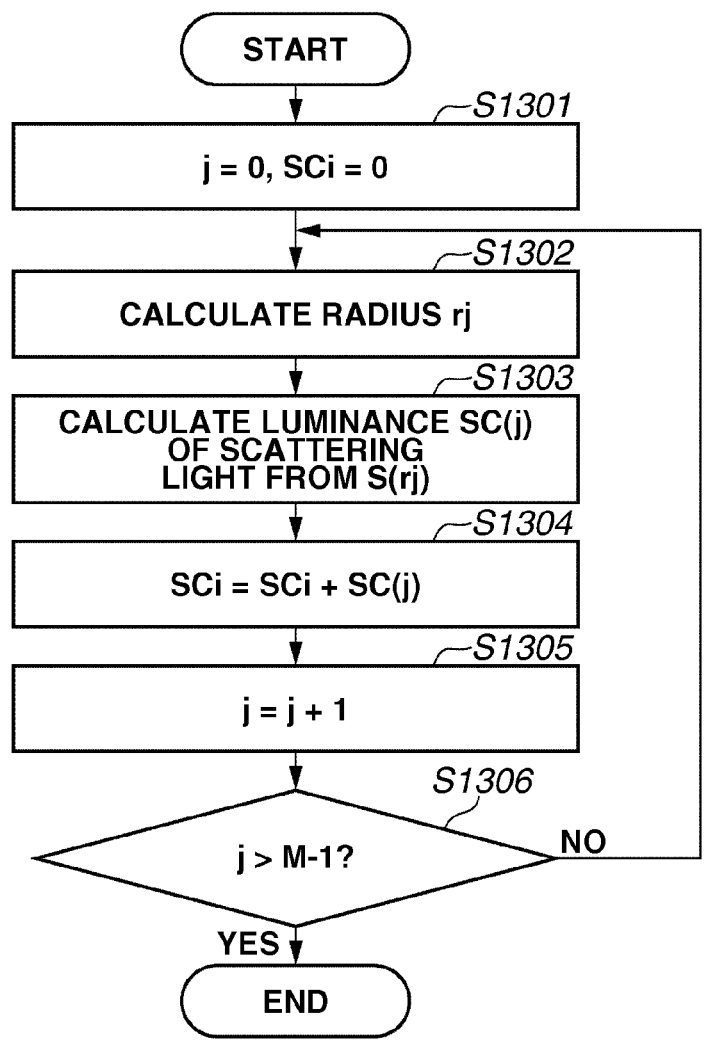
FIG. 13 is a flowchart illustrating internal scattering reproducing processing.

Hereinafter, the processing of switching the scattering functions is described. FIG. 13 is a flowchart which can be applied to the second exemplary embodiment.

In step S1301, the variable j is initialized to 0, while the luminance SCi of the internal scattering light of the pixel Pi is also initialized to 0.

In step S1302, the distance ri(j) between the pixel Pi and the j-th sampling point Pi(j) is calculated. The distance ri(j) is calculated by Equation 5, as in a same manner as illustrated in FIG. 11B.

$$r_i(j) = \sqrt{x_j^2 + z_j^2}$$ Equation 5

In step S1303, the scattering function Sy(r) to be referred to is determined based on the height information of the normal line map. The luminance SCi(j) is calculated from the distance ri(j) and the luminance Di(j) of the surface reflected light at each sampling point. In step S1304, the calculated luminance SCi(j) of the internal scattering light is added to the luminance SCi of the internal scattering light.

In step S1305, the variable j is increased by 1. In step S1306, the variable j is compared to the number of samplings M to determine whether the processing for all the sampling points has been completed.

If the processing is determined to be "completed" at all of the sampling points (YES in step S1306), the entire processing is ended, while the processing returns to step S1302 to continue the processing if the processing is determined to be "not completed" (NO in step S1306).

Thus, the luminance of the internal scattering light entering through each sampling point and is emitted from the point Pi can be calculated. In addition, the effect obtained through the aforementioned method can also be obtained through another method which uses a database (reference table) capable of acquiring the luminance of the internal scattering light according to the distance ri(j) and the height information of the normal line map.

Through the processing described above, a CG image that is much closer to the original image can be generated without losing reproduction of the fine unevenness caused by the bump mapping method, by performing the processing for reproducing the internal scattering.

In a third exemplary embodiment, a method for performing the processing at high speed without using the sampling point is described.

Figure 14:
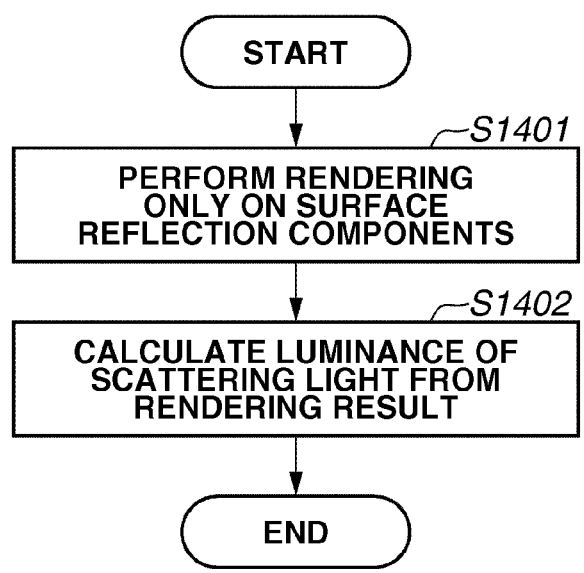
FIG. 14 is a flowchart illustrating a method for reproducing internal scattering only based on peripheral pixels.

FIG. 14 is a flowchart illustrating a method for reproducing the skin image without using the sampling point.

In step S1401, the luminance D of the surface reflected light of a target pixel is calculated. In step S1402, a spectral radiance (entire spectral radiance) I of the target pixel is calculated using Equation 2. At this time, sampling is not carried out, and the calculation is performed using peripheral pixels of the target pixel.

To be more specific, the luminance of the internal scattering light is calculated based on the luminance D of the surface reflected light of each peripheral pixel of the target pixel, and the distance from each peripheral pixel taking the fine surface shape into consideration. Thereafter, the luminance of the internal scattering light of each peripheral pixel is added, and the total value acquired therefrom is determined as the luminance of the internal scattering light of the target pixel. This processing is executed on all the pixels. Through the processing above, the calculation amount can be reduced considerably, and the CG image faithfully corresponding to the original image can be generated at high speed.

Each of the aforementioned exemplary embodiments can be realized by performing the following processing. That is, the above-described exemplary embodiments can be realized through processing in which software (computer program) capable of realizing each processing and function of the above-described exemplary embodiments is provided to a system of a computer via a network or from a recording medium, so that the system of the computer (or a device such as a CPU or the like) reads and executes the computer program thereof. The above computer program and a computer readable recording medium storing the computer program are also included within the scope of the invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-176044 filed Aug. 11, 2011, which is hereby incorporated by reference herein in its entirety.

What is claimed is:

1. An image processing apparatus configured to generate a computer graphics expressing an object, comprising:
a first acquisition unit configured by a processor to acquire height information indicating a relative height difference on a surface of the object;
a second acquisition unit configured by the processor to acquire at least a scattering function representing an internal scattering characteristic of light of the object wherein the internal scattering characteristic is a function according to a distance; and a calculation unit configured by the processor to calculate a distance between a target pixel and a sampling point different from the target pixel based on the height information and calculate a pixel value of the target pixel in the object according to the calculated distance with reference to the scattering function.

2. An image processing apparatus configured to generate a computer graphics expressing an object, comprising:

a first acquisition unit configured by a processor to acquire height information indicating a relative height difference on a surface of the object;

a second acquisition unit configured by the processor to acquire at least a scattering function representing an internal scattering characteristic of light of the object, wherein the scattering function represents an internal scattering characteristic according to a distance from a target pixel; and a calculation unit configured by the processor to calculate each pixel value of the object based on the height information and the scattering function, wherein the calculation unit calculates each pixel value of the object based on luminance of internal scattering light which enters through a sampling point and is emitted from the target pixel according to the distance.

3. The image processing apparatus according to claim 1, wherein the calculation unit performs blurring processing using the scattering function according to the distance.

4. The image processing apparatus according to claim 1, wherein the calculation unit selects a scattering function from among a plurality of scattering functions according to the height information.

5. The image processing apparatus according to claim 1, wherein the sampling point is located in a vicinity of the target pixel, and a plurality of the sampling points is extracted from the vicinity of the target pixel.

6. The image processing apparatus according to claim 1, wherein the sampling point is located in a periphery of the target pixel.

7. The image processing apparatus according to claim 1, wherein the sampling point is extracted from within a predetermined region calculated based on the height information.

8. The image processing apparatus according to claim 7, wherein the predetermined region is determined based on a distance from the target pixel, which is calculated for each angle from the target pixel.

9. The image processing apparatus according to claim 1, wherein the height information is a normal line map in which a normal line is stored.

10. The image processing apparatus according to claim 9, wherein the normal line map is generated from information representing a relative height difference.

11. A non-transitory computer-readable recording medium storing a computer program for controlling a computer to function as each unit of the image processing apparatus according to claim 1.

12. An image processing method for an image processing apparatus a processor for generating computer graphics expressing an object, the image processing method comprising:

acquiring by the processor height information representing a relative height difference on a surface of the object;

acquiring by the processor at least one scattering function representing an internal scattering characteristic of light in the object wherein the internal scattering characteristic is a function according to a distance; and calculating by the processor a distance between a target of and a sampling point different from the target pixel based on the height information and calculate a pixel value of the target pixel in the object according to the calculated distance with reference to the scattering function.

13. A non-transitory computer-readable recording medium storing a computer program for controlling a computer to perform the method of claim 12.

* * * * *